US009778850B1

(12) United States Patent
Cao et al.

(10) Patent No.: US 9,778,850 B1
(45) Date of Patent: Oct. 3, 2017

(54) TECHNIQUES FOR ZEROING NON-USER DATA AREAS ON ALLOCATION

(71) Applicant: EMC Corporation, Hopkinton, MA (US)

(72) Inventors: Gang Cao, Shanghai (CN); Shay Harel, Marlborough, MA (US); Walter Wang, Shanghai (CN); Feng Zhang, Shanghai (CN); Zhu Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/971,112

(22) Filed: Dec. 16, 2015

(51) Int. Cl.
*G06F 3/06* (2006.01)

(52) U.S. Cl.
CPC ............ *G06F 3/061* (2013.01); *G06F 3/0631* (2013.01); *G06F 3/0638* (2013.01); *G06F 3/0673* (2013.01); *G06F 2212/1016* (2013.01); *G06F 2212/60* (2013.01)

(58) Field of Classification Search
CPC ............... G06F 3/0605; G06F 3/0649; G06F 17/30067; G06F 17/30286; G06F 3/0644; G06F 3/0665; G06F 3/0683; G06F 3/0607; G06F 3/0611; G06F 3/0632; G06F 3/064; G06F 3/067; G06F 3/0685; G06F 3/0689
See application file for complete search history.

(56) References Cited

U.S. PATENT DOCUMENTS

| 7,694,119 | B1 | 4/2010 | Scharland et al. |
| 7,743,171 | B1 | 6/2010 | Hwang et al. |
| 7,949,637 | B1 | 5/2011 | Burke |
| 2009/0070541 | A1 | 3/2009 | Yochai |
| 2014/0223141 | A1* | 8/2014 | Combs ................ G06F 12/1036 712/207 |
| 2015/0169231 | A1* | 6/2015 | Kanigicherla ........ G06F 3/0611 710/5 |

* cited by examiner

*Primary Examiner* — Yong Choe
(74) *Attorney, Agent, or Firm* — Muirhead and Saturnelli, LLC

(57) ABSTRACT

Described are techniques for processing a write operation that writes first data to a target location of a logical address range of a logical device. It is determined whether the target location is mapped to physical storage. Responsive to determining that the target location is not mapped to physical storage, performing first processing to service the write operation. The first processing includes sending the write operation along with a hint to a caching layer where the hint indicates to store zeroes to locations that do not include user data. The caching layer forms a data portion denoting data stored at a logical address subrange of the logical device. The logical address subrange includes the target location. The data portion includes the first data and zeroes stored at remaining locations of the logical address subrange not including user data. The data portion is stored in cache by the caching layer.

20 Claims, 8 Drawing Sheets

TECHNIQUES FOR ZEROING NON-USER DATA AREAS ON ALLOCATION

BACKGROUND

Technical Field

This application generally relates to data storage.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices that are non-volatile storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of logical units, logical devices or logical volumes. The logical units may or may not correspond to the actual physical drives. Allowing multiple host systems to access the single data storage system allows the host systems to share data stored therein.

SUMMARY OF THE INVENTION

In accordance with one aspect of the invention is a method of processing a write operation comprising: receiving the write operation on a data storage system, the write operation indicating to write first data to a target location of a logical address range of a logical device; determining whether the target location is mapped to physical storage; responsive to determining that the target location is not mapped to physical storage, performing first processing to service the write operation, the first processing comprising: sending the write operation along with a hint to a caching layer, the hint indicating to store zeroes to locations that do not include user data; forming, by the caching layer, a data portion denoting data stored at a logical address subrange of the logical address range of the logical device, said logical address subrange including the target location, said data portion including the first data stored at the target location and zeroes that are stored at remaining locations of the logical address subrange and that denote locations of the logical address subrange not including user data; and storing, by the caching layer, the data portion in cache. The data portion may have a size that is equal to an allocation unit, and the allocation unit may be a size granularity indicating that any physical storage allocation has a size that is a multiple of the allocation unit. The remaining locations may be logical addresses of the logical address subrange to which no write has been issued. The method may include allocating first physical storage mapped to the logical address subrange of the logical address range of the logical device, and writing the data portion from the cache to the first physical storage. The write operation may be sent from a client and an acknowledgement may be returned to the client regarding completion of the write after the data portion is stored in the cache. The write operation may be sent from a client of the data storage system and data used by the client may be stored on the data storage system. The client may be an application executing on a host that is external from the data storage system. The client may be internal within the data storage system and the write operation may be generated internally within the data storage system by the client. The client may be software that creates a snapshot of a logical device to which the write is directed. The logical device may be a virtually provisioned logical device and physical storage may be allocated for the logical address subrange upon a first write being issued to a logical address of the logical address subrange. The write operation may be received by a virtual provisioning layer which communicates with the caching layer to service the write operation. The caching layer and the virtual provisioning layer may be drivers included in an I/O runtime stack of a data path to process I/O operations on the data storage system. The target location may denote a plurality of consecutive logical address locations having a starting logical address and a length. The virtual provisioning layer may create a data structure including information identifying the logical device and the starting logical address, the length, the hint, and a first size of an allocation unit, the first size being a size of the data portion and denoting an amount of physical storage allocated for storing the data portion, and the method may include the virtual provisioning layer sending the data structure to the caching layer.

In accordance with another aspect of the invention is a system comprising: a processor; and a memory comprising code stored therein that, when executed, performs a method of processing a write operation comprising: receiving the write operation on a data storage system, the write operation indicating to write first data to a target location of a logical address range of a logical device; determining whether the target location is mapped to physical storage; responsive to determining that the target location is not mapped to physical storage, performing first processing to service the write operation, the first processing comprising: sending the write operation along with a hint to a caching layer, the hint indicating to store zeroes to locations that do not include user data; forming, by the caching layer, a data portion denoting data stored at a logical address subrange of the logical address range of the logical device, said logical address subrange including the target location, said data portion including the first data stored at the target location and zeroes that are stored at remaining locations of the logical address subrange and that denote locations of the logical address subrange not including user data; and storing, by the caching layer, the data portion in cache.

In accordance with another aspect of the invention is a computer readable medium comprising code stored thereon that, when executed, performs a method of processing a write operation comprising: receiving the write operation on a data storage system, the write operation indicating to write first data to a target location of a logical address range of a logical device; determining whether the target location is mapped to physical storage; responsive to determining that the target location is not mapped to physical storage, performing first processing to service the write operation, the first processing comprising: sending the write operation along with a hint to a caching layer, the hint indicating to store zeroes to locations that do not include user data; forming, by the caching layer, a data portion denoting data stored at a logical address subrange of the logical address range of the logical device, said logical address subrange including the target location, said data portion including the first data stored at the target location and zeroes that are stored at remaining locations of the logical address subrange and that denote locations of the logical address subrange not including user data; and storing, by the caching layer, the data portion in cache. The data portion may have a size that is equal to an allocation unit, and the allocation unit may be a size granularity indicating that any physical storage allocation has a size that is a multiple of the allocation unit. The remaining locations may be logical addresses of the logical address subrange to which no write has been issued. The method may include allocating first physical storage mapped to the logical address subrange of the logical address range of the logical device; and writing the data portion from the cache to the first physical storage. The write operation may be sent from a client and an acknowledgement may be returned to the client regarding completion of the write after the data portion is stored in the cache.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
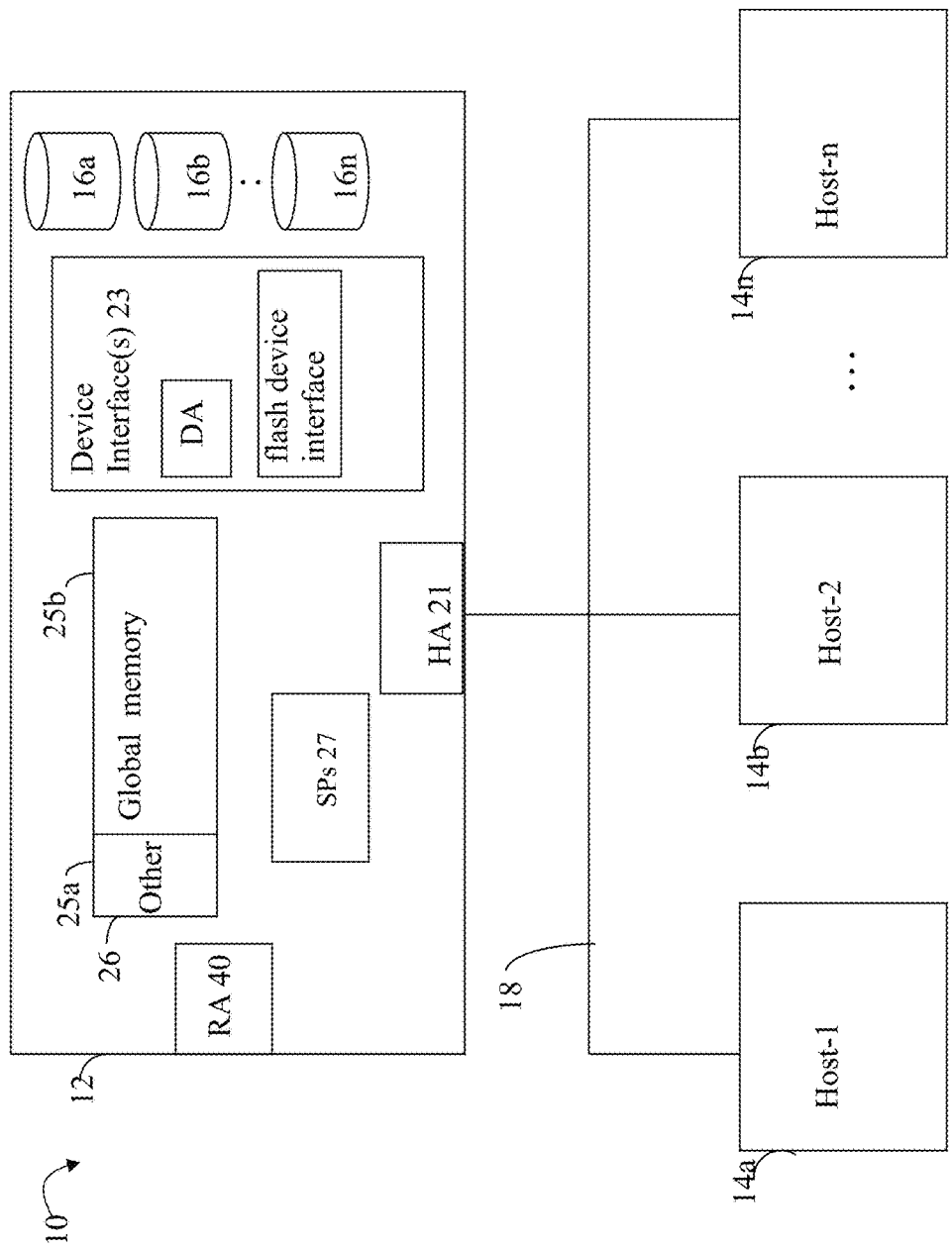
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM) 25b. In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives (e.g., such as 16a-n of FIG. 1) or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical device (PD) and location on the PD. The DA which services the particular PD may further perform processing to either read data from, or write data to, the corresponding physical device location for the I/O operation.

It should be noted that each of the different adapters, such as HA21, DA or disk interface, RA, and the like, may be implemented as a hardware component including, for example, one or more processors, one or more forms of memory, and the like. Code may be stored in one or more of the memories of the component for performing processing.

Figure 2:
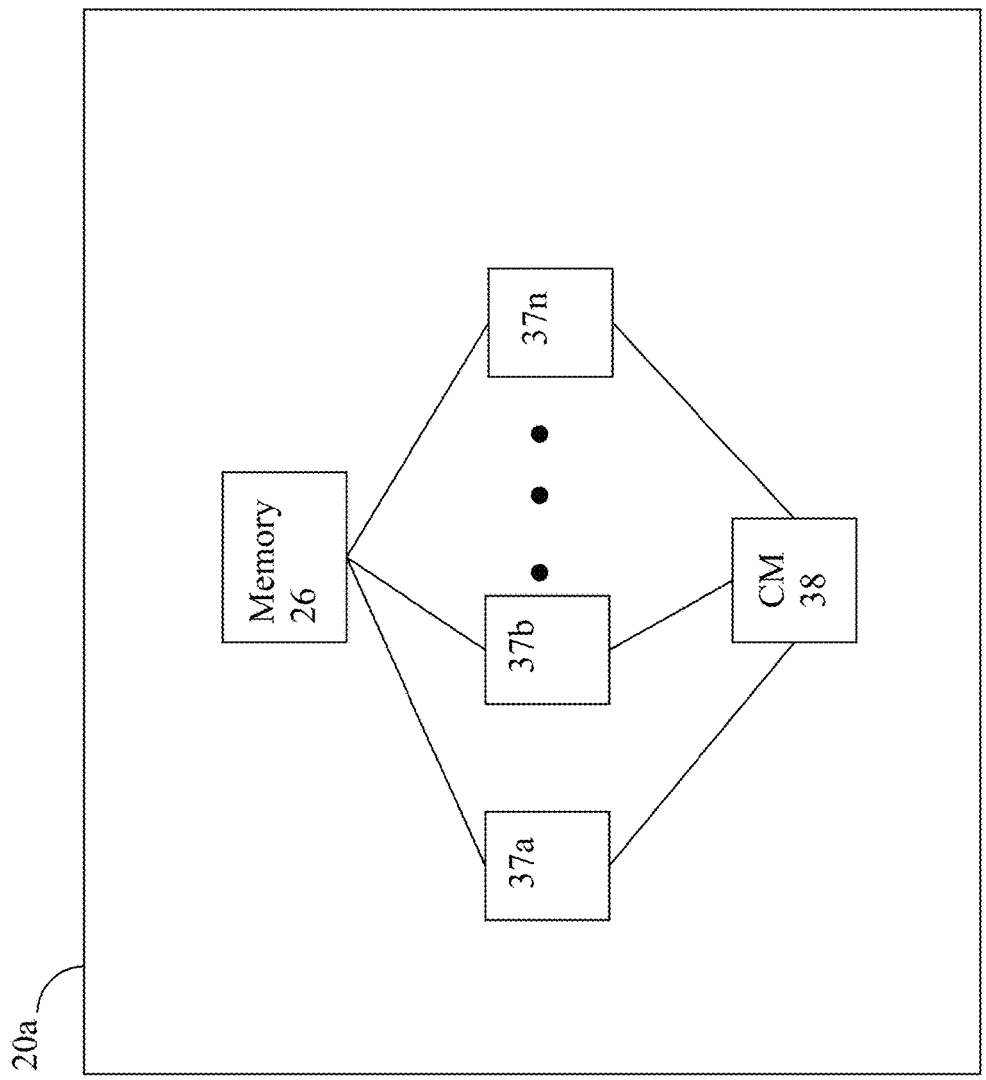
FIG. 2 is a representation of the logical internal communications between the directors and memory in an embodiment of a data storage system in accordance with techniques herein.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. In connection with performing I/O operations, such as writes as well as reads, a data storage system in an embodiment in accordance with techniques herein may use a cache in order to improve performance. For example, in connection with a write operation, an embodiment may first store the data in data cache (also referred to simply as a cache) included in a portion of GM 25b, mark the cache slot including the write operation data as write pending (WP), and then later destage the WP data from cache to one of the devices 16a-16n. In at least one embodiment, an acknowledgement that the write operation has completed may be returned to the host, application or other data storage system client that sent the write operation once the write data has been stored to the cache. In connection with returning data to a host from one of the physical storage devices as part of a read operation, the data may be copied from the physical storage device by the appropriate device interface, such as a DA servicing the physical storage device. The device interface may copy the data read into a cache slot included in GM which is, in turn, communicated to the appropriate HA in communication with the host.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe™ data storage system by EMC Corporation of Hopkinton, Mass., that includes multiple storage processors (SPs) 27.

Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

In at least one embodiment of a data storage array using techniques herein, the data storage devices 16a-16n may include a combination of disk devices (e.g., rotating disk drives) and flash devices in which the flash devices may appear as standard Fibre Channel (FC) drives to the various software tools used in connection with the data storage array.

A data storage system may support one or more different types of logical devices presented as LUNs. For example, a data storage system may provide for configuration of thick or regular LUNs and also virtually provisioned or thin LUNs. A thick or regular LUN is a logical device that, when configured to have a total usable capacity such as presented to a user for storing data, has all the physical storage provisioned for the total usable capacity. In contrast, a thin or virtually provisioned LUN having a total usable capacity (e.g., a total logical capacity as published or presented to a user) is one where physical storage may be provisioned on demand, for example, as data is written to different portions of the LUN's logical address space. Thus, at any point in time, a thin or virtually provisioned LUN having a total usable capacity may not have an amount of physical storage provisioned for the total usable capacity. The granularity or the amount of storage provisioned at a time for a virtually provisioned LUN may vary with embodiment. In one embodiment, physical storage may be allocated, such as a single allocation unit of storage, the first time there is a write to a particular target logical address (e.g., LUN and location or offset on the LUN). The single allocation unit of physical storage may be larger than the size of the amount of data written and the single allocation unit of physical storage is then mapped to a corresponding portion or subrange of the logical address range of a LUN. The corresponding portion of the logical address range includes the target logical address. Thus, at any point in time, not all portions of the logical address space of a virtually provisioned device may be associated or mapped to allocated physical storage depending on which logical addresses of the virtually provisioned LUN have been written to at a point in time. In at least one embodiment in accordance with techniques herein, the write operation may identify the target location to which data is being written using a starting offset or location and length denoting the amount or size of the data being written. Thus, the target location may denote multiple logical addresses, such as logically consecutive logical addresses, of the LUN.

Thin devices and thin provisioning, also referred to respectively as virtually provisioned devices and virtual provisioning, are described in more detail, for example, in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, and U.S. Pat. No. 7,949,637, Issued May 24, 2011, Storage Management for Fine Grained Tiered Storage with Thin Provisioning, to Burke, both of which are incorporated by reference herein.

As noted above, in connection with thin or virtually provisioned LUNs, physical storage may be allocated in fixed size portions referred to as allocation units or chunks and physical storage of an allocation unit at a corresponding logical address subrange of the LUN may be allocated the first time there is a write to any logical address in the logical address subrange. The size of a write operation the first time there is a write to the logical address subrange may not be an exact multiple of the allocation unit. For example, the physical storage allocation unit may be 64K bytes and the first write to write data to an allocated 64 Kbyte chunk may be less than 64 Kbytes, or more than 64 Kbytes but not an exact multiple of 64 Kbytes. In such a case, for example, where the write data is less than the size of a single allocation unit or chunk, an embodiment in accordance with techniques herein may perform processing as described in following paragraphs to write the write data to the single allocated physical storage chunk and additionally initialize the remaining portion of the physical storage chunk. In one embodiment, the initialization may include writing zeroes to the remaining portions of the allocated chunk where the remaining portions map to logical addresses that have not yet received any writes and do not include user data. Thus, the zeroes may denote those portions of the physical storage that, although allocated and mapped to logical addresses of the LUN's logical address space, do not contain any user data, such as user data written via a write operation.

It should be noted that the size of the allocation unit in an embodiment in accordance with techniques herein may be a same fixed size for all allocations, or may also be a tunable size that may be varied.

Following examples and paragraphs may refer to use of techniques herein in connection with allocating a chunk that is an allocation unit of physical storage upon the occurrence of a first write to a logical address of a thin device in the logical address subrange that maps to the chunk. However, those skilled in the art will appreciate that such techniques should be construed as limited to the particulars of the examples provided herein and techniques herein have broader applicability than examples provided for illustration of techniques herein.

Figure 3:
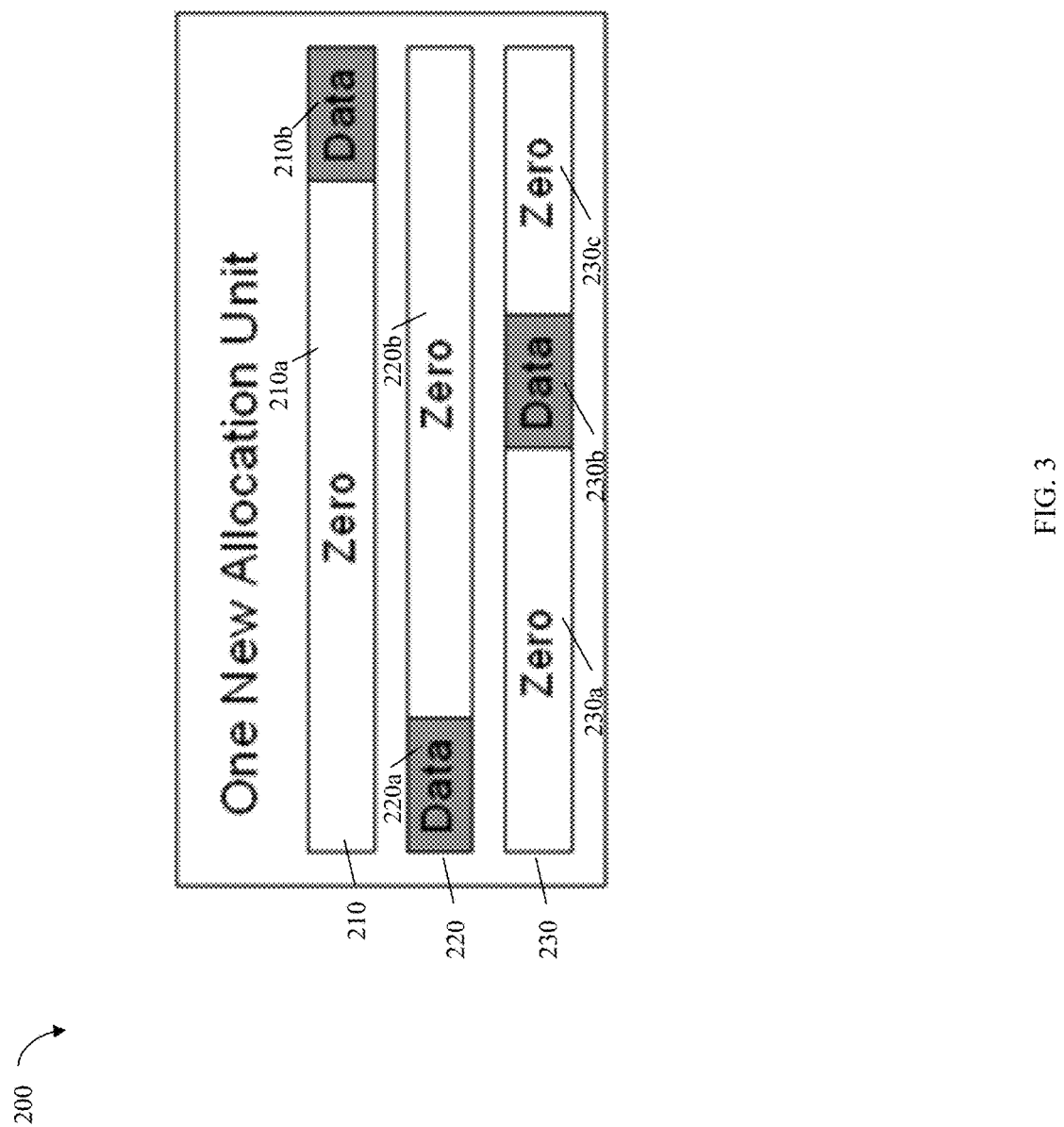
FIG. 3 is an example illustrating scenarios in connection with a write operation directed to an allocated portion of physical memory in an embodiment in accordance with techniques herein.

Referring to FIG. 3, shown is an example 200 illustrating scenarios of writing data to an allocated chunk in an embodiment in accordance with techniques herein.

Each of 210, 220 and 230 illustrate 3 possibilities or arrangements of how write data may be arranged in an allocated chunk of physical storage the size of an allocation unit the first time there is a write to write data to a logical address mapped to the allocated chunk. In connection with the 3 scenarios illustrated by 210, 220 and 230, the physical storage portions 210a, 220b, 230a and 230c may be populated with zeroes to initialize the allocated physical storage portions not containing user data.

Element 210 illustrates a first scenario when writing data to a logical address subrange that maps to a chunk of physical storage the size of an allocation unit as may be allocated upon a first write of user data to a logical address of the logical address subrange. As illustrated by 210, portion 210a denotes the portion of physical storage of the allocated chunk 210 for which there is no user data written at the time the physical storage chunk 210 is allocated. Portion 210b denotes the portion of physical storage of the allocated chunk 210 to which user data is written (e.g. the user data written by the first write to the logical address subrange) at the time the physical storage chunk 210 is allocated.

Element 220 illustrates a second scenario when writing data to a logical address subrange that maps to a chunk of physical storage the size of an allocation unit as may be allocated upon a first write of user data to a logical address to the logical address subrange. As illustrated by 220, portion 220b denotes the portion of physical storage of the allocated chunk 220 for which there is no user data written at the time the physical storage chunk 220 is allocated. Portion 220a denotes the portion of physical storage of the allocated chunk 220 to which user data is written (e.g. the user data written by the first write to the logical address subrange) at the time the physical storage chunk 220 is allocated.

Element 230 illustrates a third scenario when writing data to a logical address subrange that maps to a chunk of physical storage the size of an allocation unit as may be allocated upon a first write of user data to a logical address to the logical address subrange. As illustrated by 230, portion 230a and 230c denote the portions of physical storage of the allocated chunk 230 for which there is no user data written at the time the physical storage chunk 230 is allocated. Portion 230b denotes the portion of physical storage of the allocated chunk 230 to which user data is written (e.g. the user data written by the first write to the logical address subrange) at the time the physical storage chunk 230 is allocated.

Thus, in the example 200, elements 210 and 220 illustrate examples of writes to an end of the allocated chunk whereby the physical storage that does not contain any user data forms a single contiguous portion of the chunk, and element 230 illustrates an example where data is written to a location of the allocated chunk whereby the physical storage that does not contain any user data is formed by two contiguous portions at opposite ends of the allocated chunk.

Figure 4:
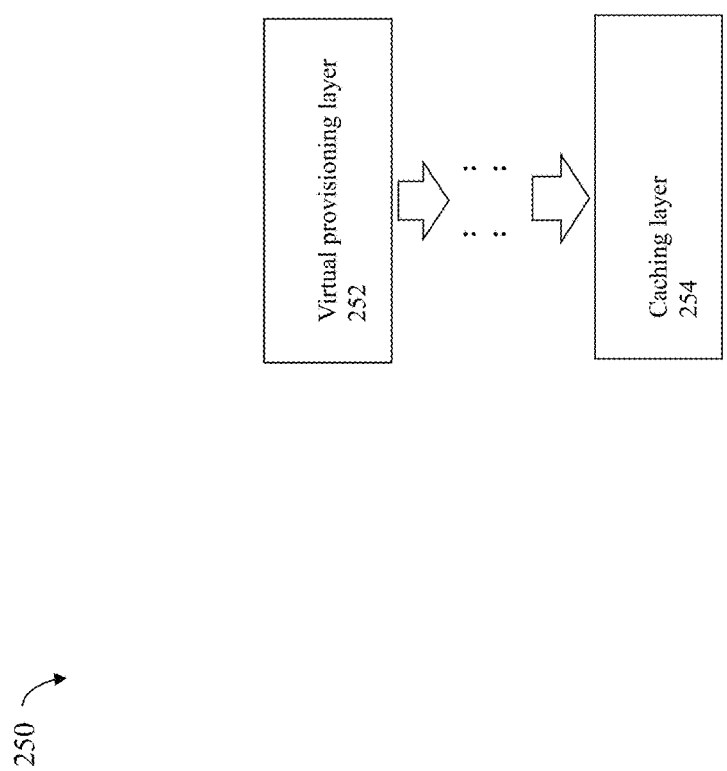
FIG. 4 is an example illustrating layers or drivers of a runtime I/O stack in an embodiment in accordance with techniques herein.

Referring to FIG. 4, shown is an example illustrating software layers or drivers of a runtime I/O stack that may be used in an embodiment in accordance with techniques herein. The example 250 illustrates software layers or drivers that may be included in the runtime I/O stack when processing a write operation in accordance with techniques herein. The I/O stack may include the virtual provisioning layer or driver 252 and the caching layer or driver 254. The I/O stack may include additional layers or drivers above 252 in the stack, between 252 and 254 in the stack and/or below 254 in the stack as may vary with embodiment. The virtual provisioning layer or driver 252 may perform processing as described elsewhere herein in connection with processing the write I/O directed to a thin or virtually provisioned LUN. The caching layer or driver 254 may perform processing as described elsewhere herein to write data to a cache location where the cache location includes data of a write operation directed to a target location on the LUN and where the target location may be further mapped to allocated physical storage (e.g. on one or more physical storage devices of the data storage system). As described in more detail in an embodiment in accordance with techniques herein, the cache location may also include an necessary zeroes at locations corresponding to logical addresses of the LUN which do not contain user data (e.g., no write to such logical addresses has yet been performed such as illustrated in connection with the scenarios of FIG. 3) At some point in time after the data (write data and zeroes) is stored in the cache location, the data is destaged from the cache to the allocated physical storage.

Figure 5:
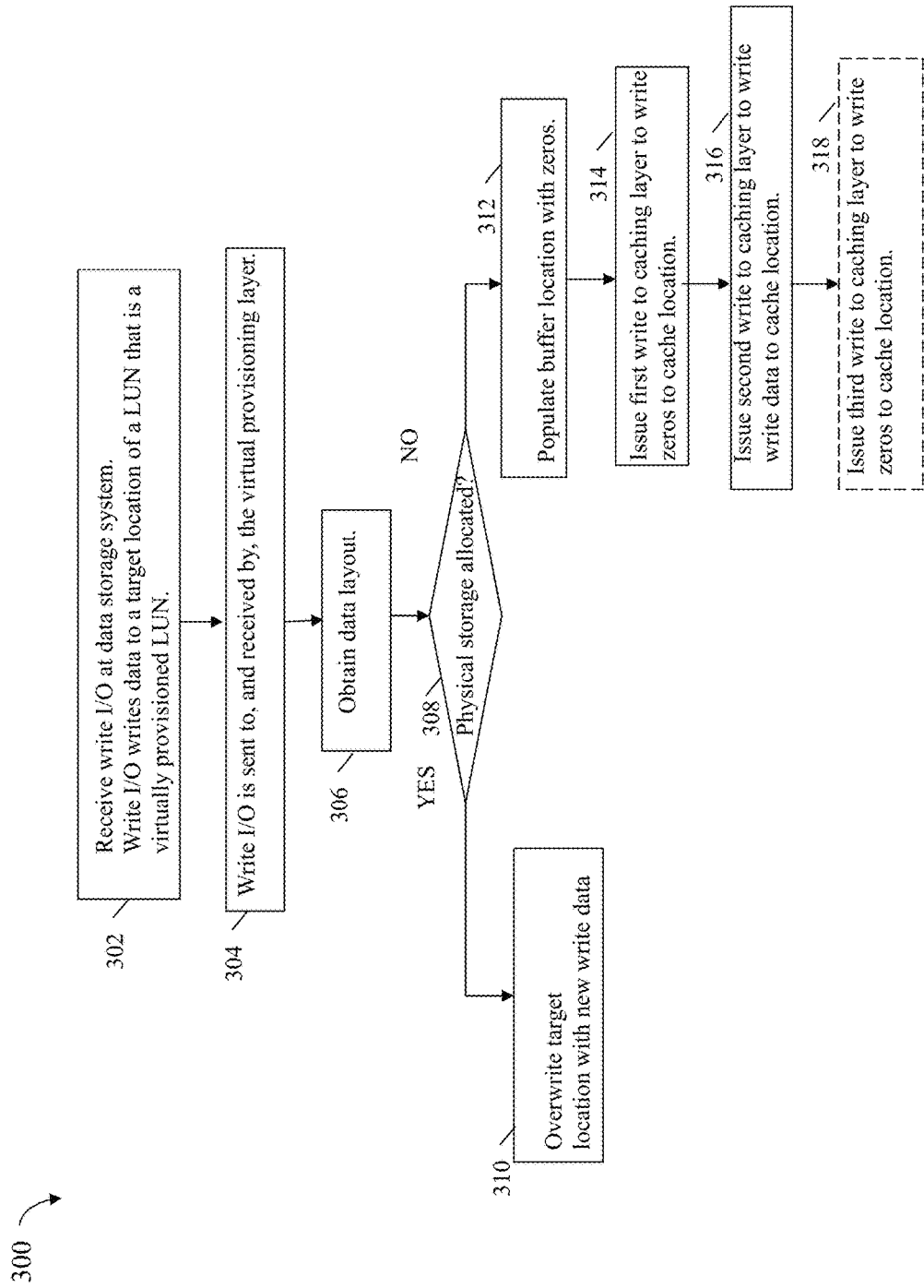
FIG. 5 is an example of processing steps that may be performed in an embodiment not in accordance with techniques herein.

Referring to FIG. 5, shown is an example flowchart of processing steps that may be performed in an embodiment not in accordance with techniques herein for processing a write operation. At step 302, the write I/O operation is received at the data storage system from a client. The client write I/O writes data to a target location of a LUN that is a virtually provisioned LUN. At step 304, the write I/O is sent to, and received by, the virtual provisioning layer of the runtime I/O stack. At step 306, the virtual provisioning layer may obtain data layout information for the LUN where the data layout information indicates whether and what physical storage, if any, is currently mapped to, or allocated for, the target location of the write operation. The target location may be included in a logical address subrange of the LUN's logical address space where the logical address subrange may have a size equal to that of an allocation unit of physical storage. At step 308, a determination is made as to whether physical storage for the logical address subrange including the target location of the LUN has been allocated. If step 308 evaluates to yes, control proceeds to step 310 to process the write operation by overwriting the target location of the LUN with the new write data. Step 310 may include storing the new write data to cache and then later destaging the new write data from cache to the already allocated physical storage (having a corresponding physical storage location denoted by the data layout information obtained in step 306).

If step 308 evaluates to no, processing may proceed to step 312 to commence further processing that includes writing the write operation data along with any needed zeroes to the non user data portions of the newly allocated chunk of physical storage. Assume that either of scenarios 210 or 220 of FIG. 3 is applicable in connection with processing the write operation. In this case, step 312 includes performing processing to determine the length or number of logical address locations to include zeroes (e.g., as stored in 210a or 220b arrangements of FIG. 3) and then populate a buffer with a sufficient number of zeroes. At step 314, a first write is issued from the virtual provisioning layer to the caching layer to write the zeroes to the logical addresses of the logical address subrange at which non user data is stored (e.g., write zeroes to logical addresses of logical address subrange denoted by 210a or 220b). At step 316, a second write is issued from the virtual provisioning layer to the caching layer to write the write data to the target location (e.g., write the write data to one or more logical addresses of the logical address subrange denoted by 210b or 220s). It should be noted that in the event the third scenario denoted by element 230 of FIG. 3 is applicable to the current write operation whereby the target location is in the middle of the logical address subrange, then an additional third write I/O operation in step 318 may be performed. In connection with processing a write operation where the scenario illustrated by 230 of FIG. 3 is applicable, the first write operation at step 314 may write a first portion of zeroes 230a and the second write operation at step 318 may write the second portion of zeros 230c.

In a system performing processing of FIG. 5 not in accordance with techniques herein, two or three writes are performed (e.g., in steps 314, 316 and possibly 318) to complete servicing the single received write I/O operation. In one aspect, the foregoing 2 or 3 writes (e.g., steps 314, 316 and 318) may be characterized as individual write operations performed as part of a larger write transaction to complete the single client write I/O operation received in step 302. In such an embodiment not using techniques herein, there may be inefficiencies, for example, since the writes are performed serially and require communication overhead between the different layers or drivers and additional processing time. Such processing not in accordance with techniques herein may also require additional memory allocation and mapping between the layers in connection with composing the buffer used for storing the zeroes communicated between the layers or drivers of the I/O stack such as illustrated in FIG. 4. Additionally, such processing not in accordance with techniques herein may result in data inconsistency due to the multiple writes between drivers or layers in steps 314, 316 and possibly 318 (depending on the scenario applicable to the write I/O operation received in step 302). In other words, completing the entire write transaction for the single received write I/O operation of the client includes completing all of the foregoing multiple writes. There may be data inconsistencies and data integrity issues if all such writes of the transaction do not complete (e.g., at least one of the writes completes but all such writes of the transaction do not complete) as may occur, for example, due to a power failure or other event that interrupts completion of all such multiple writes of the transaction.

What will now be described in following paragraphs are techniques that may be used where such techniques overcome problems and drawbacks as noted above in connection with the processing of FIG. 5 not in accordance with techniques herein.

Figure 6:
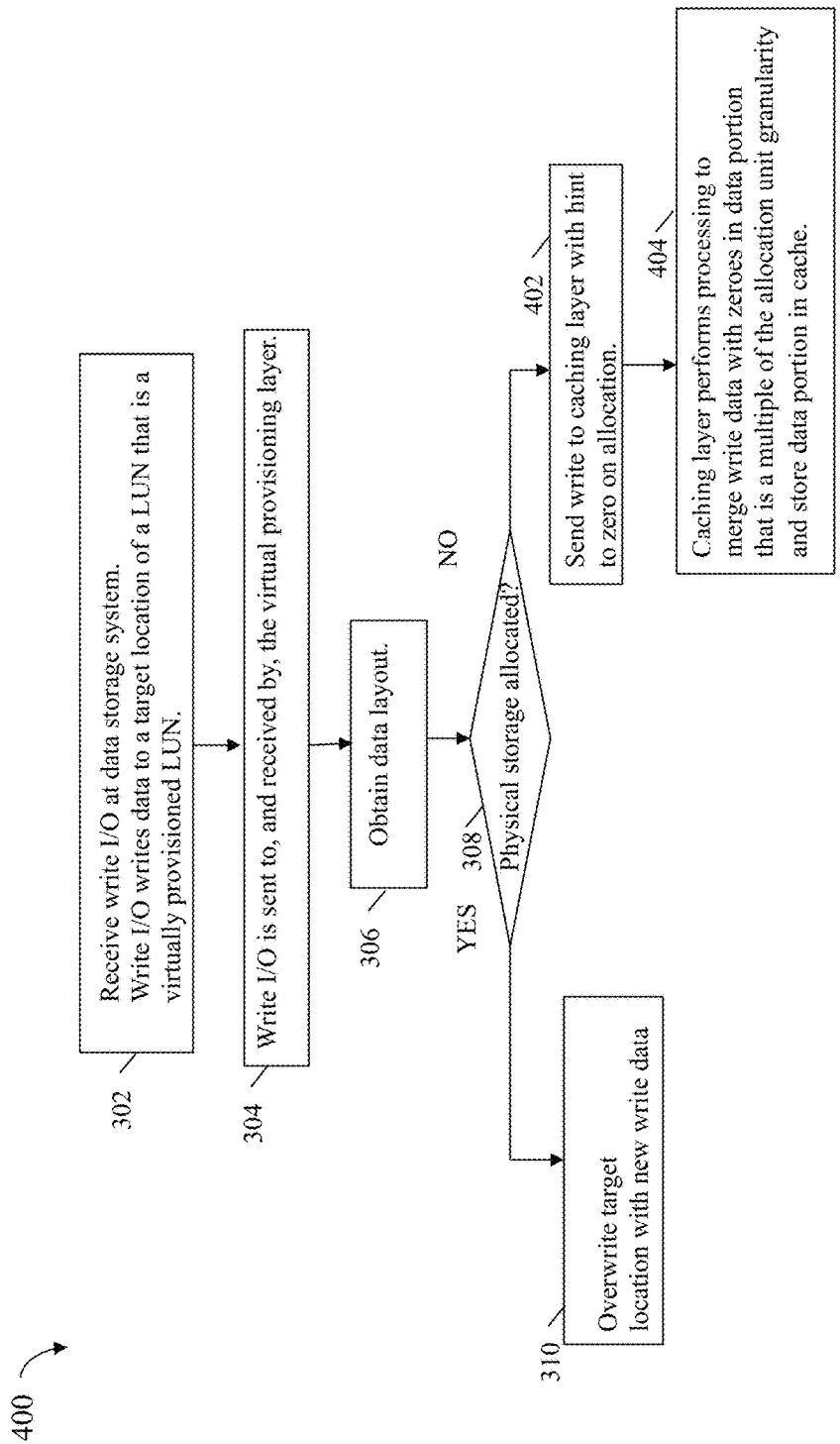
FIG. 6 is an example of processing steps that may be performed in an embodiment in accordance with techniques herein.

Referring to FIG. 6, shown is a flowchart of processing steps that may be performed in an embodiment in accordance with techniques herein. The flowchart 400 includes steps 302, 303, 306, 308 and 310 as described in connection with FIG. 5. The flowchart 400 also includes new steps 402 and 404 which are performed in response to step 308 evaluating to no when no physical storage has been allocated or is associated with the target location and the LUN's logical address subrange including the target location. Thus, step 308 evaluating to no means that the current write I/O received from the client in step 302 and now being processed is the first write to the logical address subrange of the LUN. If step 308 evaluates to no, control proceeds to step 402 where a single write operation along with a hint is sent to the caching layer from the virtual provision layer. The single write operation indicates to write the write data of the client write I/O operation received in step 302. Additionally, the hint also sent to the caching layer indicates to the caching layer to zero out the non user data locations of the physical storage that will be allocated and mapped to the logical address subrange. At step 404, the caching layer receives the write operation along with the hint. In step 404, the caching layer performs processing to merge the write data with zeroes in a data portion having a size of an allocation unit granularity. The caching layer then also stores the data portion in cache. At some later point in time, the cached data portion (which includes the zeroes in the non-user data locations and also includes the write data) is written out to physical storage newly allocated with the current write being processed. In at least one embodiment, the allocation of the physical storage may be performed at any suitable time. For example, the allocation may be performed when writing the data portion from cache to physical storage where the allocated physical storage is the size of an allocation unit and the allocated physical storage may then be accordingly mapped to the logical address subrange of the logical address range of the LUN.

In connection with step 404, the virtual provisioning layer instructs the caching layer (via the write operation and the associated hint) to handle merging the write data and any needed zeroes in non-user data locations. It is the hint passed in step 402 which additionally instructs the caching layer to perform processing to merge the write data with additional zeroes in non-user data locations where such merged write data and zeroes are then stored in cache and also later destaged from cache to the newly allocated physical storage chunk.

In one embodiment, the write operation and hint sent to the caching layer may be embodied in a structure, such as an IRP (I/O request packet). An example representation of an IRP that may be used in an embodiment in accordance with techniques herein is illustrated in FIG. 7.

Figure 7:
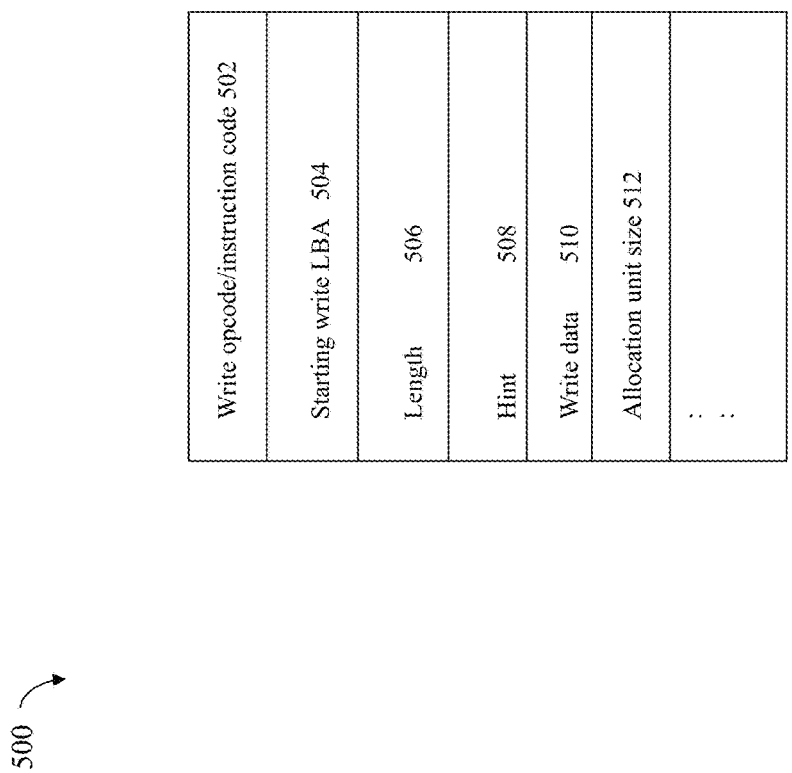
FIG. 7 is an example of a structure that may be used in an embodiment in accordance with techniques herein.

In the example 500 of FIG. 7, the IRP may be a structure that includes information such as a write opcode or instruction code 502, a starting write LBA 504 (starting location of where write data is to be written), a length 506 (denoting the length of the write data), the hint 508, the write data 510 (e.g., may be the actual write data or otherwise identify (such as with a pointer to) the location of the write data), the allocation unit size 512, and possibly other information. In one embodiment, the hint 508 may be a flag having a value of 0 or 1 where a value of 1 means that the caching layer is to store zeroes to non-user data areas of the allocated chunk, and a value of 0 means otherwise to not zero the non-user data areas. In connection with techniques herein, the hint 508 may be set to 1 in the IRP structure sent to the caching layer in step 402. The allocation unit size 512 may indicate the size allocation unit of granularity when allocating physical storage which is used to store the data portion (including the merged write data and zeroes for the non-user data areas). As described elsewhere herein, processing may be performed by the caching layer or other suitable code or module to allocate a new physical storage chunk that has a size indicated by the allocation unit size 512. The newly allocated chunk may then be mapped to the logical address subrange including the target location to which the write data is being written. Additionally, other non-user data areas (logical addresses of the subrange not being written to) have zeroes stored at their corresponding physical storage locations in the newly allocated chunk.

The virtual provisioning layer in an embodiment in accordance with techniques herein sends, in step 402, the IRP structure for the write operation with the hint 508 set to indicate to the caching layer to store zeroes in any non-user data areas of the allocated chunk where such non-user data areas have not yet been written to (e.g., do not contain user data). The caching layer determines the non-user data areas of the allocated chunk to be zeroed. The caching layer also aggregates or merges the zeroes for the non-user data areas with the write data to form a merged data portion that is stored in cache and then subsequently destaged to the newly allocated physical storage chunk.

Thus, an embodiment in accordance with techniques herein has advantages and improvements over other processing, such as FIG. 5, not in accordance with techniques herein. Techniques such as described in connection with FIG. 6 in comparison to FIG. 5 have increased performance, increased efficiency, and less overhead. For example, FIG. 5 processing performs 2 or 3 writes and calls between different software layers or drivers. In contrast, FIG. 6 at step 402 issues a single write between such layers. Additionally, issuing only the single write in step 402 also decreases the possibility of data inconsistency as compared to possibly not performing all required 2 or 3 writes to service the client write I/O operation. Thus, the caching layer performs processing for merging the zeroed non user data areas with the write data. In an embodiment in accordance with techniques herein, the caching layer manages and performs processing for the write operation atomically including zeroing non user data areas and merging such zeroed non user data areas with the write data in a single data portion which is stored to cache and then to newly allocated physical storage. Thus, all such processing is performed by the single caching layer or driver.

It should be noted that generally, techniques described herein may be used to process any write operation received in step 302 of FIG. 6 from a client. I/Os, such as the write I/Os processed in connection with techniques herein, may be sent from a client that is external with respect to the data storage system or internal with respect to the data storage system. As an example of a client that is external with respect to the data storage system, an application executing on a host may issue write I/Os received at a data storage system. Such write I/Os may be processed in accordance with techniques described herein and may be directed to a LUN having physical storage provisioned on the data storage system for use by the application (e.g., the LUN may store the application's data). As an example of a client that is internal with respect to the data storage system, an application or data storage service executing on or within a processor of the data storage system may issue write I/Os received at a data storage system. One example of a data storage system internal client issuing write I/Os that may be processed in accordance with techniques herein may be write I/Os issued by a snapshot application, facility or service that creates snapshots of LUNs. A snapshot may be characterized as a point in time logical image of data. In connection with LUNs, software of a data storage system may provide one or more data replication services or facilities whereby a snapshot is one such facility. The SnapView™ application by EMC Corporation is an application provided by EMC Corporation which may be used to create point in time snapshot of production data for nondisruptive backup. A snapshot may be made with respect to a source LUN thereby providing a point in time image of the source LUN. A snapshot may appear like a normal LUN and may be used for backup, testing, and the like. Snapshots may rely, for example, on copy on first write (COFW) and other techniques to track source LUN changes from the time when a snapshot was created. Any writes to the source LUN may result in processing by snapshot software to copy the original data prior to changes into another area of storage. With respect to COFW techniques, the COFW occurs only once for each data block modified on the source LUN. With COFW, the original data at a source LUN location may be modified via a write operation where the original data is written to another location, and the new write data may then be written to the source LUN location. Since only changed data blocks of the source LUN are retained rather than make a complete copy of the source LUN, the storage capacity required to implement snapshots may be considerably less than that of the source LUN. A snapshot of a LUN is a virtual point in time copy and requires access to the unchanged data in the source LUN. Therefore failures affecting the source LUN also affect the snapshot of the LUN. A snapshot of a LUN may be contrasted, for example, with a bit-for-bit replica or physical copy of a source LUN. Another example of a snapshot facility is VNX™ Snapshot by EMC Corporation which uses a different technology to implement snapshots. As described above, some snapshot facilities may use a COFW technique. In contrast, VNX™ Snapshot uses a technology characterized as a redirect on write (ROW) technique. After a snapshot is taken, new writes to the primary LUN are redirected (written) to a new location within a storage pool. Writes originated by either of the foregoing, as well as other snapshot facilities, may be processed in an embodiment in accordance with techniques herein.

Figure 8:
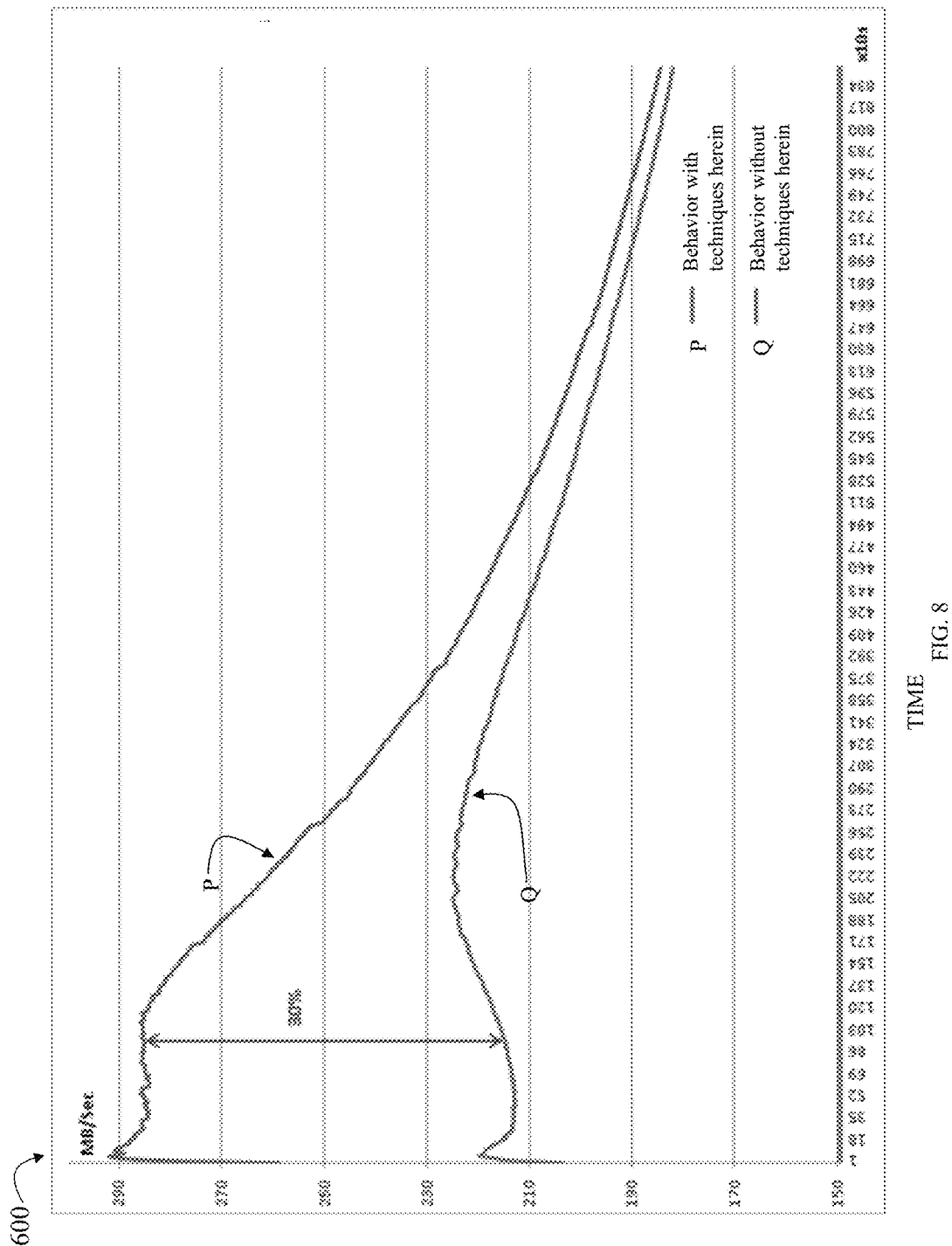
FIG. 8 is an example illustrating graphical performance comparisons in connection with an embodiment in accordance with techniques herein.

Referring to FIG. 8, shown is a graphical illustration of performance of an embodiment in accordance with techniques herein. The example 600 is a graph with a Y axis indicating total data throughput as measured in megabytes (Mbytes) per second and with an X axis denoting increasing time where each interval denotes a 10 second interval. The graph of 600 denotes the performance results of an embodiment performing processing in accordance with techniques herein illustrated by line P in comparison to performance results of an embodiment performing processing not in accordance with techniques herein illustrated by line Q. The embodiment in accordance with techniques herein having performance illustrated by line P may perform processing as described in connection with FIG. 6. Additionally, the processing performed not in accordance with techniques herein may be as illustrated in FIG. 5.

The performance illustrated in FIG. 8 is obtained in a data storage system configured to have a 64 Kbyte allocation unit under conditions where random I/Os are issued by 32 threads and reference cache storage in 64K byte portions. The random I/Os are directed to 20 thin or virtually provisioned LUNs that are initially completely unallocated. The random I/Os are approximately ⅔ reads and ⅓ writes and are 8K in size (e.g., either read or write 8K worth of data for each I/O). The 32 threads collectively issue a sufficient number of I/Os at a sufficient rate to saturate and maintain such saturation of the maximum front end data bandwidth of 8 GBs/second.

As illustrated in the example 600, there is approximately a 30% increase in performance using the techniques described herein as observed by the difference between lines P and Q. The maximum benefit of using techniques herein, such as the foregoing 30% performance improvement of line Q over line P, may be obtained during an initial time period when initially populating the LUNs with data whereby the maximum amount of zero filling is performed. The performance gap between lines P and Q narrows as time increases thus illustrating that the performance gain or difference of techniques herein also narrows as time progresses and additional writes are performed where such additional writes are not the first or initial writes.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing a write operation comprising:
    receiving the write operation on a data storage system, the write operation indicating to write first data to a target location of a logical address range of a logical device;
    determining whether the target location is mapped to physical storage;
    responsive to determining that the target location is not mapped to physical storage, performing first processing to service the write operation, the first processing comprising:
        sending the write operation along with a hint to a caching layer, the hint indicating to store zeroes to locations that do not include user data;
        forming, by the caching layer, a data portion denoting data stored at a logical address subrange of the logical address range of the logical device, said logical address subrange including the target location, said data portion including the first data stored at the target location and zeroes that are stored at remaining locations of the logical address subrange and that denote locations of the logical address subrange not including user data; and
        storing, by the caching layer, the data portion in cache.

2. The method of claim 1, wherein the data portion has a size that is equal to an allocation unit, and wherein the allocation unit is a size granularity indicating that any physical storage allocation has a size that is a multiple of the allocation unit.

3. The method of claim 1, wherein the remaining locations are logical addresses of the logical address subrange to which no write has been issued.

4. The method of claim 1, wherein the method further comprises:
    allocating first physical storage mapped to the logical address subrange of the logical address range of the logical device; and
    writing the data portion from the cache to the first physical storage.

5. The method of claim 1, wherein the write operation is sent from a client and wherein an acknowledgement is returned to the client regarding completion of the write after the data portion is stored in the cache.

6. The method of claim 1, wherein the write operation is sent from a client of the data storage system and wherein data used by the client is stored on the data storage system.

7. The method of claim 6, wherein the client is an application executing on a host that is external from the data storage system.

8. The method of claim 6, wherein the client is internal within the data storage system and wherein the write operation is generated internally within the data storage system by the client.

9. The method of claim 8, wherein the client is software that creates a snapshot of a logical device to which the write is directed.

10. The method of claim 1, wherein the logical device is a virtually provisioned logical device and wherein physical storage is allocated for the logical address subrange upon a first write being issued to a logical address of the logical address subrange.

11. The method of claim 10, wherein the write operation is received by a virtual provisioning layer which communicates with the caching layer to service the write operation.

12. The method of claim 11, wherein the caching layer and the virtual provisioning layer are drivers included in an I/O runtime stack of a data path to process I/O operations on the data storage system.

13. The method of claim 12, wherein the target location denotes a plurality of consecutive logical address locations having a starting logical address and a length.

14. The method of claim 13, wherein the virtual provisioning layer creates a data structure including information identifying the logical device and the starting logical address, the length, the hint, and a first size of an allocation unit, the first size being a size of the data portion and denoting an amount of physical storage allocated for storing the data portion, and wherein the method includes the virtual provisioning layer sending the data structure to the caching layer.

15. A system comprising:
    a processor; and
    a memory comprising code stored therein that, when executed, performs a method of processing a write operation comprising:

receiving the write operation on a data storage system, the write operation indicating to write first data to a target location of a logical address range of a logical device;

determining whether the target location is mapped to physical storage;

responsive to determining that the target location is not mapped to physical storage, performing first processing to service the write operation, the first processing comprising:

sending the write operation along with a hint to a caching layer, the hint indicating to store zeroes to locations that do not include user data;

forming, by the caching layer, a data portion denoting data stored at a logical address subrange of the logical address range of the logical device, said logical address subrange including the target location, said data portion including the first data stored at the target location and zeroes that are stored at remaining locations of the logical address subrange and that denote locations of the logical address subrange not including user data; and storing, by the caching layer, the data portion in cache.

16. A non-transitory computer readable medium comprising code stored thereon that, when executed, performs a method of processing a write operation comprising:

receiving the write operation on a data storage system, the write operation indicating to write first data to a target location of a logical address range of a logical device;

determining whether the target location is mapped to physical storage;

responsive to determining that the target location is not mapped to physical storage, performing first processing to service the write operation, the first processing comprising:

sending the write operation along with a hint to a caching layer, the hint indicating to store zeroes to locations that do not include user data;

forming, by the caching layer, a data portion denoting data stored at a logical address subrange of the logical address range of the logical device, said logical address subrange including the target location, said data portion including the first data stored at the target location and zeroes that are stored at remaining locations of the logical address subrange and that denote locations of the logical address subrange not including user data; and storing, by the caching layer, the data portion in cache.

17. The non-transitory computer readable medium of claim 16, wherein the data portion has a size that is equal to an allocation unit, and wherein the allocation unit is a size granularity indicating that any physical storage allocation has a size that is a multiple of the allocation unit.

18. The non-transitory computer readable medium of claim 16, wherein the remaining locations are logical addresses of the logical address subrange to which no write has been issued.

19. The non-transitory computer readable medium of claim 16, wherein the method further comprises:

allocating first physical storage mapped to the logical address subrange of the logical address range of the logical device; and writing the data portion from the cache to the first physical storage.

20. The non-transitory computer readable medium of claim 16, wherein the write operation is sent from a client and wherein an acknowledgement is returned to the client regarding completion of the write after the data portion is stored in the cache.

* * * * *

UNITED STATES PATENT AND TRADEMARK OFFICE
CERTIFICATE OF CORRECTION

PATENT NO.         : 9,778,850 B1
APPLICATION NO.    : 14/971112
DATED              : October 3, 2017
INVENTOR(S)        : Gang Cao et al.

Page 1 of 1

It is certified that error appears in the above-identified patent and that said Letters Patent is hereby corrected as shown below:

On the Title Page

(71) Applicant should read: EMC IP Holding Company LLC, Hopkinton, MA (US)

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*